(12) United States Patent
Zoellner

(10) Patent No.: US 6,761,187 B1
(45) Date of Patent: Jul. 13, 2004

(54) TUBULAR ASSEMBLY HAVING AN INTERNAL PLUG

(75) Inventor: Olaf J. Zoellner, Leverkusen (DE)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

(21) Appl. No.: 10/406,520

(22) Filed: Apr. 3, 2003

(51) Int. Cl.[7] ............................................. F16L 55/10
(52) U.S. Cl. ........................... 138/89; 138/94; 138/155; 285/21.1; 285/21.2; 285/290.4
(58) Field of Search ............................... 138/89, 92, 94, 138/155, 120; 285/21.1, 21.2, 290.4

(56) References Cited

U.S. PATENT DOCUMENTS

| | | | |
|---|---|---|---|
| 2,901,003 A | * 8/1959 | Rosner et al. ................. | 138/89 |
| 3,204,274 A | * 9/1965 | Knapp .................... | 15/104.061 |
| 3,907,049 A | * 9/1975 | Baffas ......................... | 138/155 |
| 4,119,100 A | * 10/1978 | Rickett .................. | 604/103.03 |
| 4,541,649 A | 9/1985 | Grünfeld ................. | 280/281 R |
| 5,190,803 A | 3/1993 | Goldbach et al. ............ | 428/138 |
| 5,224,738 A | * 7/1993 | Taga ............................ | 285/14 |
| 5,364,130 A | * 11/1994 | Thalmann ................... | 285/21.2 |
| 5,404,630 A | 4/1995 | Wu .............................. | 29/423 |
| 5,797,613 A | 8/1998 | Busby ......................... | 280/284 |
| 5,842,265 A | 12/1998 | Rink ............................ | 29/460 |
| 5,865,456 A | 2/1999 | Busby et al. ................ | 280/284 |
| 5,924,906 A | 7/1999 | Grafton ....................... | 446/121 |
| 5,937,496 A | 8/1999 | Benoit et al. ............... | 29/419.2 |
| 5,940,949 A | 8/1999 | Rink .......................... | 29/33 K |
| 5,944,124 A | * 8/1999 | Pomerleau et al. ......... | 175/320 |
| 5,988,696 A | 11/1999 | Ruppert .................... | 285/123.1 |
| 6,426,031 B1 | 7/2002 | Hayes, Jr. .................... | 264/318 |

* cited by examiner

Primary Examiner—James Hook
(74) Attorney, Agent, or Firm—Joseph C. Gil; James R. Franks

(57) ABSTRACT

A tubular assembly which includes a first (or outer) tube (12), a second (or inner) tube (21) and a plug (42) within the second tube (21) is described. The plug (42) resides within at least a portion of the second tube (21), which itself resides within a portion of the first tube (12). The first (12) and second (21) tubes each have perforations (15, 24), at least some of which are aligned. The plug (42) has cavities (45) in its exterior surface (48), at least some of which are aligned with the aligned perforations (36). Plastic material (e.g., thermoplastic material) is molded through aligned perforations (36) and at least partially fills aligned cavities (45). The edges (39) of aligned perforations (36) are embedded in the plastic material (53) molded therethrough. The plastic material (53) extending through aligned perforations (36), into cavities (45) and embedding perforation edges (39) therein, serves to fixedly attach the first tube (12), second tube (21) and plug (42) together.

20 Claims, 7 Drawing Sheets

TUBULAR ASSEMBLY HAVING AN INTERNAL PLUG

DESCRIPTION OF THE INVENTION

The present invention relates to a tubular assembly that includes an internal plug. The internal plug (e.g., a solid plug of thermoplastic material) resides within at least a portion of a second tube, a portion of which resides within a first tube. Each of the first and second tubes have perforations that are aligned. The exterior surface of the plug includes cavities, at least some of which are aligned with the aligned perforations of the first and second tubes. Plastic material (e.g., thermoplastic material) is injected into the aligned cavities of the plug through the aligned perforations of the first and second tubes. The injected plastic material at least partially fills the aligned cavities, and embeds the edges of the aligned perforations therein, thus fixedly attaching the first tube, second tube and plug together.

Tubular frames are often used in support structures for the purpose of providing a combination of desirable physical properties, such as rigidity and stability, with a reduction in weight, relative to solid or more solid support structures. Support structures that make use of tubular frames include, for example, chairs (e.g., aircraft and automotive seats), wheel chairs, aircraft and automotive space frames, and motorcycle and bicycle frames.

Tubular frames typically include a plurality of tubular members that are assembled together by means including, for example, welding, brazing, soldering, crimping, gluing, and/or screwing the ends of the tubular members together. In addition, fasteners, such as rivets, may be used to join the ends of the tubular members together. The weakest point of a tubular frame is typically the point where the ends of the tubular members are connected together. When placed under load (e.g., cyclical loading): welds, brazings and solder points can crack; crimped and screwed tube ends can come undone; and adhesives and fasteners can fail, e.g., crack or shear.

It would be desirable to develop tubular assemblies that provide a combination of desirable physical properties, such as strength and rigidity, with light weight. In addition, it would be desirable that such newly developed tubular assemblies have tubular connection points that have improved resistance to failure under load.

U.S. Pat. No. 4,541,649 discloses a connection between at least one first tube and a second tube of a bicycle frame. The first tube of the connection of the '649 patent has a flared terminus that is in engagement with the outer surface of the second tube. An injection-molded one-piece plastic casing fully surrounds the end portion of the first tube and fully surrounds a circumferential portion of the outer surface of the second tube in the zone of the engagement of the flared terminus of the first tube with the second tube.

U.S. Pat. Nos. 5,797,613 and 5,865,456 disclose a flex joint for a vehicle frame (e.g., a bicycle frame). The flex joint includes a flexible member of durable material (e.g., a metal plate), an encasement surrounding the flexible member (e.g., of nylon), and bores through ends of the flex joint. The ends of the flex joint of the '613/'456 patent are disclosed as being inserted within a circular frame end having openings (e.g., openings 119). Shoulder pins are disclosed as being inserted into the bores of the flex joint through the openings in the circular frame ends.

U.S. Pat. No. 5,937,496 discloses plastic connection elements (having recesses) for tubular frames. The plastic connection elements of the '496 patent are inserted within a hollow end of a tubular element, and the tubular element is deformed relative to the recesses of the plastic connection element, thus forming a tight fit there between.

U.S. Pat. No. 5,404,630 discloses a method of joining a frame tube to a lug. The method of the '630 patent includes: forming through-holes in the lug; inserting a frame tube into the lug; deforming the frame tube such that outward projections are formed therefrom that engage the through-holes in the lug; placing a reinforcing tube within the frame tube; and deforming the reinforcing tube such that outward projections are formed therefrom that engage with the inside wall of the frame tube.

In accordance with the present invention, there is provided a tubular assembly comprising:

(a) a first tube having a plurality of perforations having edges;

(b) a second tube having a plurality of perforations having edges, a portion of said second tube residing within a portion of said first tube, and at least some of said perforations of said first and second tubes being aligned and together defining aligned perforations having edges; and (c) a plug residing within at least a portion of said second tube, said plug having an exterior surface, said exterior surface having cavities therein, at least some of said cavities being aligned with said aligned perforations of said first and second tubes, wherein said tubular assembly is prepared by a process comprising molding plastic material through at least some of said aligned perforations of said first and second tubes and into said aligned cavities within said plug, the edges of said aligned perforations being embedded in the plastic material extending therethrough, thereby fixedly attaching said first tube, said second tube and said plug together.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings.

Unless otherwise indicated, all numbers or expressions, such as those expressing structural dimensions, process conditions, etc. used in the specification and claims are understood as modified in all instances by the term "about."

BRIEF DESCRIPTION OF THE DRAWINGS

In FIGS. 1 through 7, like reference numerals and characters designate the same components and structural features.

DETAILED DESCRIPTION OF THE INVENTION

Figure 1:
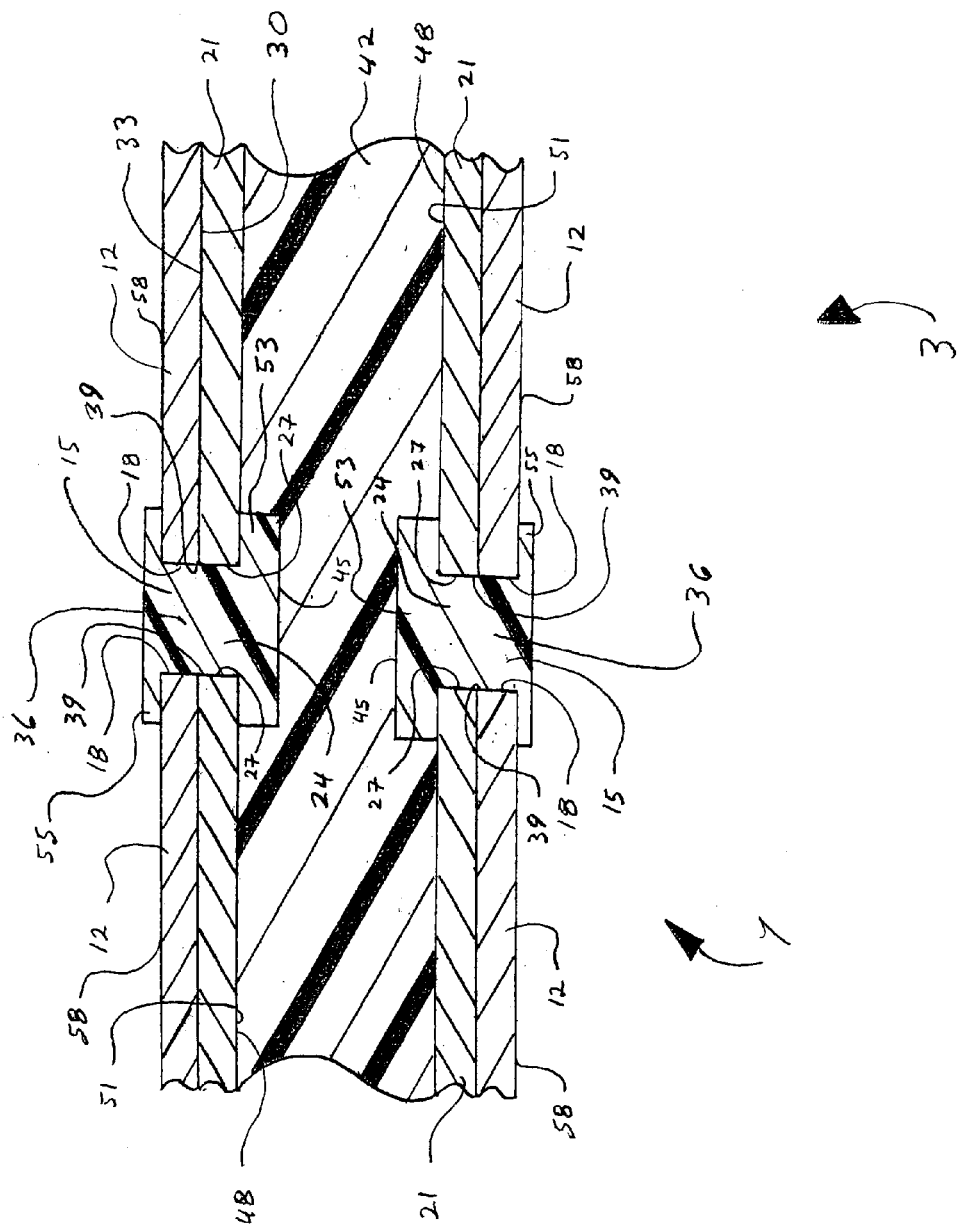
FIG. 1 is a representative sectional view of a tubular assembly according to the present invention.

Referring now to FIG. 1 of the drawing figures, there is shown a representative sectional view of a tubular assembly 3 according to the present invention. More particularly, FIG. 1 depicts an overlap region 1 of tubular assembly 3. Tubular assembly 3 includes a first (or outer) tube 12 having perforations 15. Each perforation 15 has edges 18. Tubular assembly 3 also includes a second (or inner) tube 21 having perforations 24, each of which has edges 27. A portion of second tube 21 resides within a portion of first tube 12.

A portion of the exterior surfaces 30 of second tube 21 abut the inner surfaces 33 of first tube 12. In an embodiment of the present invention, only a portion of exterior surface 30 of second tube 21 abuts inner surface 33 of first tube 12, in the overlap region 1 of the two tubes (not shown). Such a partial abutment between the tubes can be achieved, for example, by means of raised portions (such as ribs or bumps) on exterior surface 30 of second tube 21 that are in abutment with inner surface 33 of first tube 12 (not shown). Alternatively, or in addition to raised portions on exterior surface 30 of second tube 21, inner surface 33 of first tube 12 may have raised portions (such as bumps or ribs) that abut exterior surface 30 of second tube 21 (not shown).

First tube 12, and second tube 21 may each independently be selected from, for example, substantially cylindrical tubes, substantially elliptical tubes, polygonal tubes (e.g., square tubes, rectangular tubes, pentagonal tubes, hexagonal tubes, heptagonal tubes, octagonal tubes, etc.), and combinations thereof (e.g., tubes having substantially cylindrical terminal portions connected by means of a polygonal tubular section). Preferably, first tube 12 and second tube 21 are each selected from substantially cylindrical tubes. Further preferably, the overlap connection region of first and second tubes 12 and 21 is comprised of substantially cylindrical first and second tube portions.

Perforations 15 of first tube 12 are aligned with perforations 24 of second tube 21, and together define aligned perforations 36 each having edges 39. A plug 42 resides within a portion of second tube 21. The exterior surfaces 48 of plug 42 include cavities 45, at least some of which are aligned with aligned perforations 36 of first tube 12 and second tube 21.

As used herein and in the claims the term "aligned" as used with regard to the aligned perforations (e.g., aligned perforations 36) is meant to be inclusive of partially aligned perforations and substantially aligned perforations (e.g., those perforations that are substantially coaxially aligned). Further, as used herein and in the claims, the term "aligned" as used with regard to the cavities that are aligned with the aligned perforations of the first and second tubes (e.g., aligned cavities 45) is meant to be inclusive of those cavities that are partially aligned with the aligned perforations and those that are substantially aligned with the aligned perforations (e.g., those perforations that are substantially coaxially aligned with the aligned perforations).

Cavities 45 of plug 42 typically are of (or have) larger dimensions (e.g., cross sectional dimensions) than the dimensions of aligned perforations 39 (and accordingly, aligned perforations 39 are of smaller dimension than cavities 45). For example, when aligned perforations 39 and cavities 45 each have a substantially circular cross section, the diameters of cavities 45 are larger than the diameters of aligned perforations 39.

At least a portion of the exterior surfaces 48 of plug 42 abut a portion of the inner surfaces 51 of second tube 21. In an embodiment of the present invention, inner surfaces 51 of second tube 21 and/or exterior surfaces 48 of plug 42 have raised portions (e.g., bumps and/or ribs) that abut exterior surfaces 48 of plug 42 and/or inner surfaces 51 of second tube 21 respectively (not shown). Preferably, exterior surfaces 48 of plug 42 are in a substantially continuous abutting relationship with at least a portion of inner surfaces 51 of second tube 21.

Plug 42 may be selected from, for example, substantially cylindrical plugs, substantially elliptical plugs, polygonal plugs (e.g., square plugs, rectangular plugs, pentagonal plugs, hexagonal plugs, heptagonal plugs, octagonal plugs etc.), and combinations thereof (e.g., plugs having polygonal terminal portions connected by means of a substantially cylindrical section). Preferably, plug 42 is selected from substantially cylindrical plugs.

The tubular assembly of the present invention is prepared by means of molding plastic material 53 through aligned perforations 36 of first and second tubes 12 and 21, and into cavities 45 of plug 42 that are aligned therewith. The molded plastic material 53 at least partially fills, and preferably totally fills cavities 45 of plug 42. In addition, edges 39 of aligned perforations 36 are embedded in the plastic material 53 molded there through. The plastic material 53 embedding edges 39 of aligned perforations 36 is continuous with the plastic material 53 that at least partially fills cavities 45 of plug 42, and thus serves to fixedly attach first tube 12, second tube 21 and plug 42 together.

As used herein and in the claims, the term "molding plastic material" and similar terms, such as "molded on" relative to introducing plastic material through the aligned perforations and into the aligned cavities, is inclusive of: (i) processes that involve the use of a mold (e.g., injection molding and reaction injection molding); and (ii) processes that do not involve the use of a mold. Processes that do not involve the use of a mold include, for example, pouring molten thermoplastic material (or a liquid thermosetting plastic composition) through the aligned perforations and into the aligned cavities.

Tubular assemblies according to the present invention can provide improvements over prior tubular assemblies, as discussed previously herein. For example, when under load (e.g., cyclical loads) failure between plastic material 53 and edges 39 embedded therein is less likely to occur, due in part to the tight and continuous fit there between. In addition, plug 42 serves to increase the strength and resiliency of the overlap attachment regions 1 of tubular assemblies according to the present invention. For example, when the tubular assembly is under load, plug 42 stabilizes overlap connection region 1 by supporting first and second tubes 12 and 21 from the inside, and absorbing stresses that would otherwise be born alone by edges 39 of aligned perforations 36 embedded in plastic material 53.

In an embodiment of the present invention, and with further reference to FIG. 1, the plastic material 53 extending through aligned perforations 39 of first and second tubes 12 and 21 is continuous with an attachment head 55 of plastic material on exterior surface 58 of first tube 12. Attachment head 55 in conjunction with the plastic material 53 filling cavity 45 serves to further embed and fixedly hold edges 39 of aligned perforations 36 in the plastic material 53 extending there through.

Figure 4:
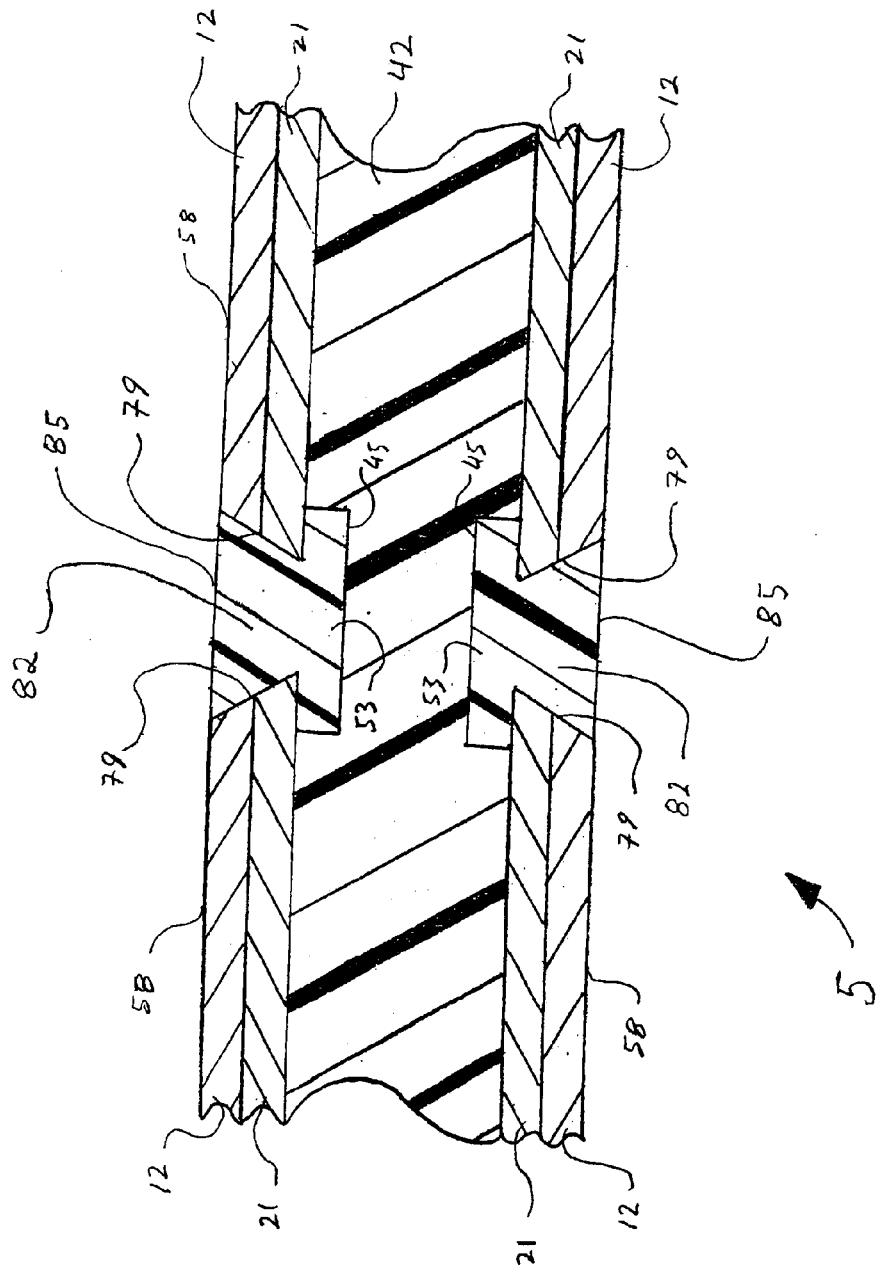
FIG. 4 is a representative sectional view of a tubular assembly according to the present invention in which the aligned perforations of the first and second tubes have deformed edge portions.

At least some of the aligned perforations of the first and second tubes may have deformed edge portions, in an embodiment of the present invention. With reference to FIG. 4, an overlap region 5 of a tubular assembly according to the present invention is depicted. First and second tubes 12 and 21 have aligned perforations 82 that are defined by deformed edge portions 79, which are embedded in the plastic material 53 extending there through and into cavities 45 of plug 42. The plastic material 53 extending through aligned perforation 82 (and filling cavity 45) is continuous with attachment head 85, which is substantially flush with exterior surface 58 of first tube 12.

Figure 2:
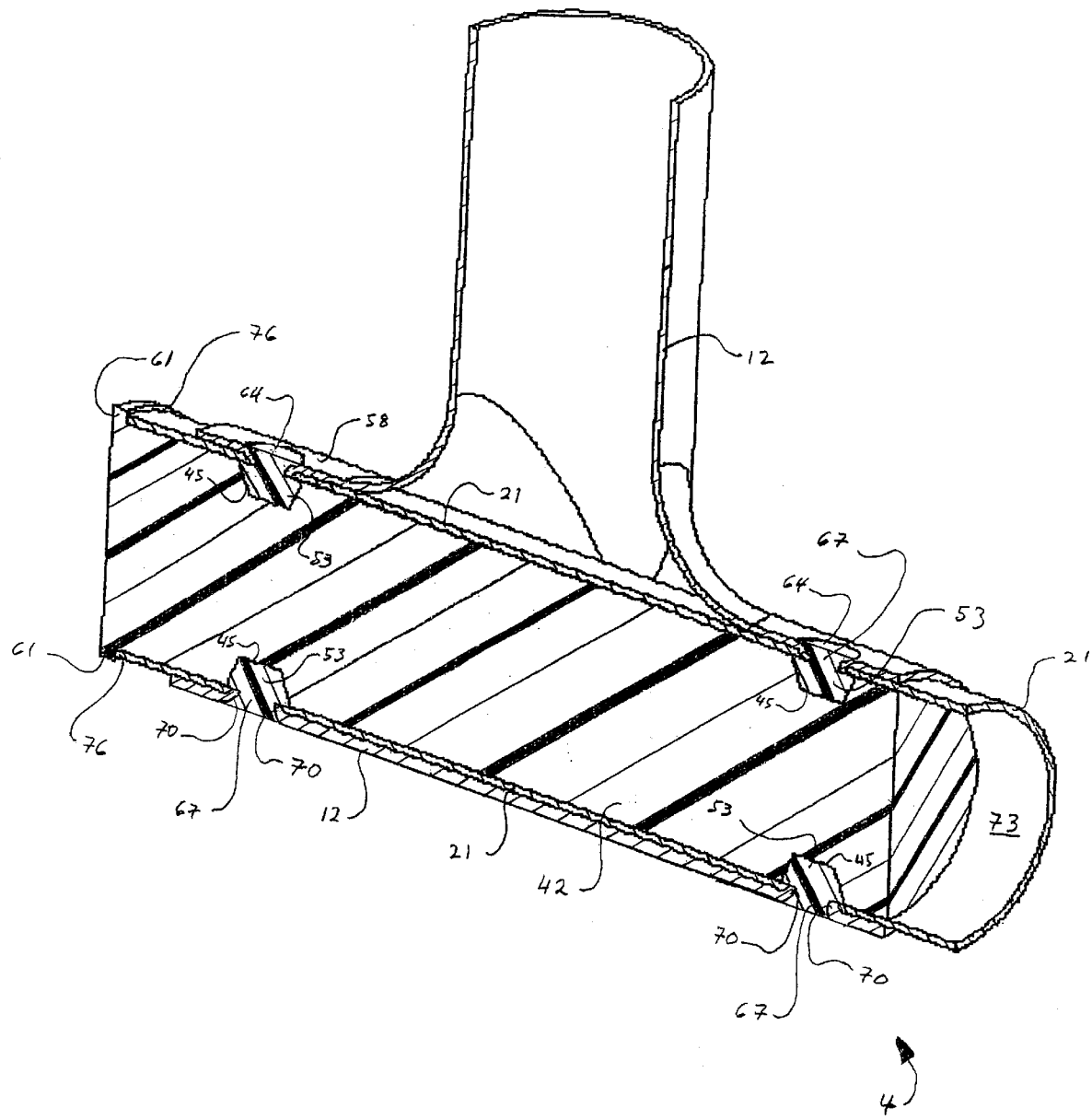
FIG. 2 is a representative perspective sectional view of a tubular assembly according to the present invention.

A perspective sectional view of a tubular assembly 4 according to the present invention, that is in the form of a T-junction, is depicted with reference to FIG. 2. First and second tubes 12 and 21 have aligned perforations 67 that are defined by deformed edge portions 70. Deformed edges 70 of aligned perforations 67 are embedded in molded plastic material 53 that extends there through and fills cavities 45 of plug 42. The plastic material 53 extending through perforations 67 into aligned cavities 45 is continuous with attachment heads 64 which are substantially flush with exterior surface 58 of first tube 12.

Figure 3:
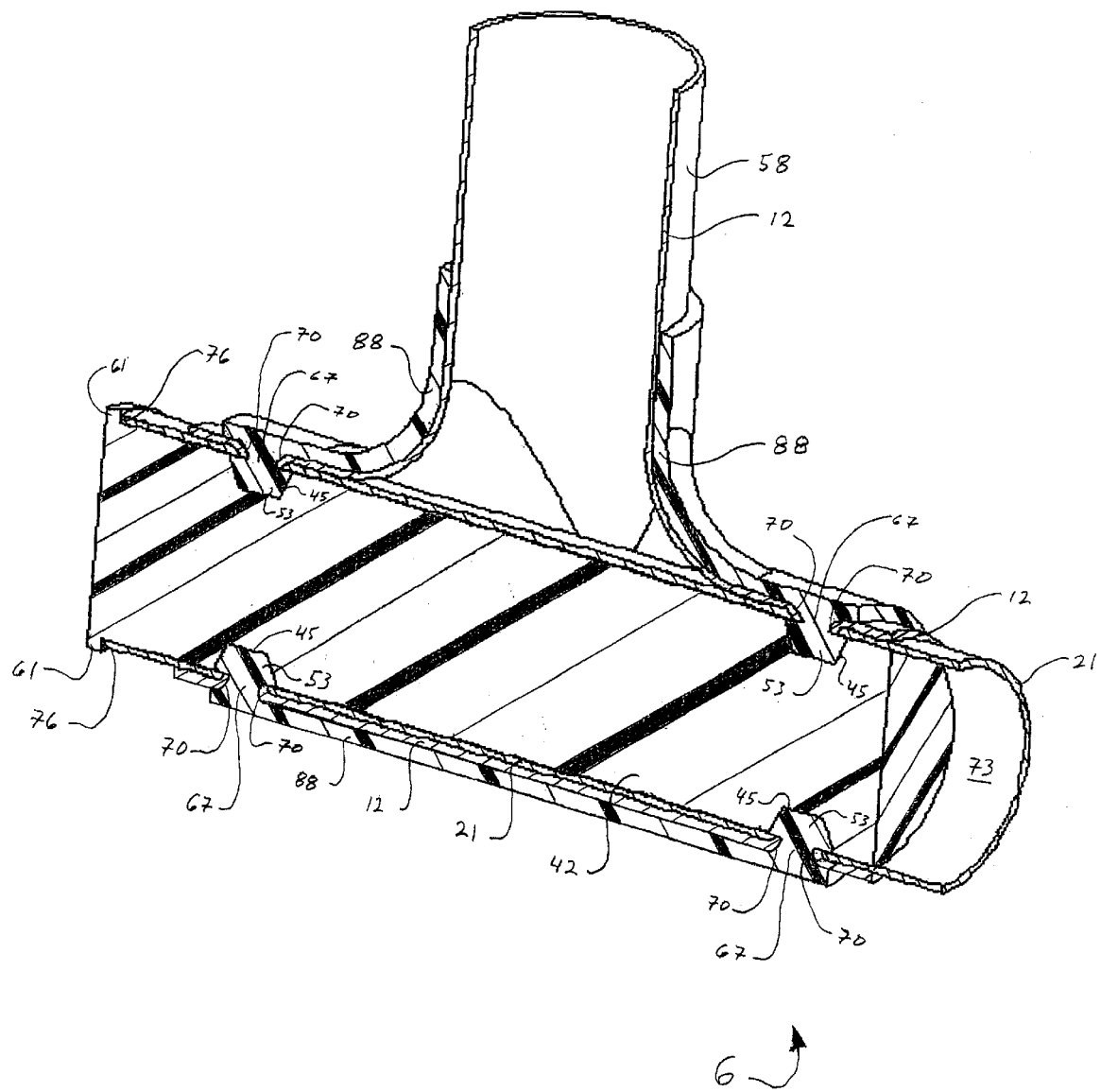
FIG. 3 is a representative perspective sectional view of a tubular assembly according to the present invention in which a portion of the exterior of the first tube is encased in molded on plastic that is continuous with the plastic material injected into the cavities of the plug.

The deformed edge portions of the aligned perforations of the tubular assemblies according to the present invention may have numerous configurations. The deformed edge portions may have configurations selected from, for example, beveled configurations (e.g., as depicted in FIG. 4), crimped configurations (e.g., as depicted in FIGS. 2 and 3) and bent configurations. Crimped edge portions include, for example, folding one edge portion (e.g., that of a perforation 15 in first tube 12) over the underlying edge portion (e.g., that of a perforation 24 is second tube 21). Deformed edge portions may be formed in accordance with known methods, such as those disclosed in U.S. Pat. No. 's 5,842,265 and 5,940,949.

In FIG. 2, plug 42 has a terminal flange 61 that extends out beyond the interior 73 of second tube 21. Terminal flange 61 engages fittingly with a terminal edge 76 of second tube 21. Terminal flange 61 can serve to further fixedly hold plug 42 within interior 73 of second tube 21.

The molded on plastic material, extending through the aligned perforations of the first and second tubes and into the aligned cavities of the plug, is continuous with molded on plastic material encasing at least a portion of the exterior surface of the first tube, in an embodiment of the present invention. A perspective sectional view of a further tubular assembly 6 according to the present invention, that is in the form of a T-junction, is depicted with reference to FIG. 3. A portion of exterior surface 58 of first tube 12 is encased in molded on plastic material 88. Molded on plastic material 88 is continuous with the plastic material 53 extending through perforations 67 and into cavities 45 of plug 42. The deformed edge portions 70 of aligned perforations 67 are embedded in the plastic material of molded on plastic material 88 and 53 extending there through. Molded on plastic material 88 protects exterior surface 58 of first tube 12 from, for example, impacts and corrosion. In a further embodiment, molded on plastic material 88 has a textured surface (not shown) that improves gripping of such surface by, for example, a human hand.

Tubular assemblies according to the present invention are typically prepared by inserting a portion of second tube 21 within first tube 12 such that at least some of the perforations in each tube are aligned. Plug 42 may be inserted within second tube 21 prior or subsequent to second tube 21 being inserted within first tube 12. Plug 42 is positioned such that at least some of perforations 45 in its exterior surface 48 are aligned with aligned perforations 36. The overlap region 1 of the tubular assembly may be then placed in a mold, and plastic material is injected through aligned perforations 36 and into cavities 45 that are aligned therewith. The injected plastic material 53 at least partially fills cavities 45 and embeds the edges 39 of the aligned perforations therein. Attachment heads 55 can be formed by means of depressions in the interior walls of the mold that are positioned over aligned perforations 36. The injected plastic material 53 is allowed to cool and/or react, and overlap connection region 1 is removed from the mold.

Plastic material 88 (see FIG. 3) is typically molded onto exterior surface 58 of first tube 12 concurrently with the injection of plastic material 53 into cavities 45. Alternatively, plastic material 88 may be molded onto exterior 58 of tube 12 after the injection of plastic material 53 into cavities 45. While plastic material 88 and 53 may be different, they are typically the same.

The plastic material (i) molded through aligned perforations 36 and injected into cavities 45 and/or (ii) molded onto exterior surface 58 of first tube 12 may be selected independently from thermoset plastic materials and/or thermoplastic materials.

As used herein and in the claims the term "thermoset plastic material" and similar terms means plastic materials having a three dimensional crosslinked network resulting from the formation of covalent bonds between chemically reactive groups, e.g., active hydrogen groups and free isocyanate groups. Thermoset plastic materials that may be injected into cavities 45 include those known to the skilled artisan, e.g., crosslinked polyurethanes, crosslinked polyepoxides and crosslinked polyesters. Of the thermoset plastic materials, crosslinked polyurethanes are preferred. Thermoset plastic materials may be injected into cavities 45 by means of the art-recognized process of reaction injection molding. Reaction injection molding of a polyurethane, for example, typically involves, as is known to the skilled artisan, injecting separately, and preferably simultaneously, into cavities 45: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The mold into which the reactive components are injected may optionally be heated to ensure and/or hasten complete reaction of the injected components. Upon complete reaction of the injected components, the mold is opened and the tubular assembly according to the present invention is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials that may be injected into cavities 45 include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. Of the thermoplastic materials that may be injected into cavities 45, thermoplastic polyamides are preferred. Thermoplastic material may be injected into cavities 45 and/or onto exterior surface 58 of first tube 12 by the art-recognized process of injection molding, in which a molten stream of thermoplastic material, e.g., molten thermoplastic polyamide, is injected into a mold, e.g., an optionally heated mold. Upon cooling the filled mold, the tubular assembly is removed. A preferred thermoplastic material that may be injected into cavities 45 and/or onto exterior surfaces 58 of first tube 12 is thermoplastic polyamide, e.g., DURETHAN thermoplastic polyamide, commercially available from Bayer Polymers LLC.

The thermoset plastic materials and/or thermoplastic materials injected into cavities 45 and/or onto exterior surface 58 of first tube 12, may optionally be reinforced with a material selected from glass fibers, carbon fibers, metal fibers, polyamide fibers and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials, injected into cavities 45 and/or onto exterior surface 58 of first tube 12, in a reinforcing amount, e.g., in an amount of from 5 percent by weight to 60 percent by weight, based on the total weight of the plastic material injected/molded on.

The thermoset plastic materials and/or thermoplastic materials injected into cavities 45 and/or onto exterior surface 58 of first tube 12 may further optionally contain one or more functional additives. Additives that may be present in the plastic material injected into cavities 45 and/or onto exterior surface 58 of first tube 12 include, but are not limited to, antioxidants, colorants, e.g., pigments and/or dyes, mold release agents, fillers, e.g., calcium carbonate, ultraviolet light absorbers, fire retardants and mixtures thereof. Additives may be present in the injected plastic material in functionally sufficient amounts, e.g., in amounts independently from 0.1 percent by weight to 10 percent by weight, based on the total weight of the plastic material injected into cavities 45 and/or onto exterior surface 58 of first tube 12.

First tube 12, second tube 21 and plug 42 may each independently be fabricated from a material selected from metal, thermoplastic material, thermosetting material and combinations thereof. Metals that may be used include, but are not limited to, iron, aluminum, steel, stainless steel, titanium and combinations thereof. Thermoplastic and thermoset plastic materials that may be used include those examples as recited previously herein. In addition, the thermoset and/or thermoplastic materials from which first tube 12, second tube 21 and plug 42 may be fabricated may optionally contain functional additives (e.g., as recited previously herein) and/or be reinforced with a material selected from, for example, glass fibers, carbon fibers, metal fibers, polyamide fibers and mixtures thereof. Reinforcing materials may be used in amounts as recited previously herein.

Functional additives may be present in amounts as recited previously herein. In a preferred embodiment, first tube 12 and second tube 21 are each independently fabricated from metal, and plug 42 is fabricated from a material selected from thermoplastic material and/or thermosetting plastic material.

The plug of the tubular assembly may be a substantially solid plug. When fabricated from a thermoset plastic material and/or thermoplastic material, the plug (e.g., plug 42) may be in the form of a foam, in which case it contains numerous voids. Plug 42 may be fabricated from an elastomeric polymeric material, such as, thermoplastic vulcanizates (e.g., KRATON polymers, commercially available from GLS Corporation) or thermoplastic polyurethanes (e.g., TEXIN thermoplastic polyurethane or DESMOPAN thermoplastic polyurethane, which are commercially available from Bayer Polymers LLC). In an embodiment, the plug is substantially free of encased inserts, such as plates and/or rods (e.g., metal plates and/or metal rods).

Figure 7:
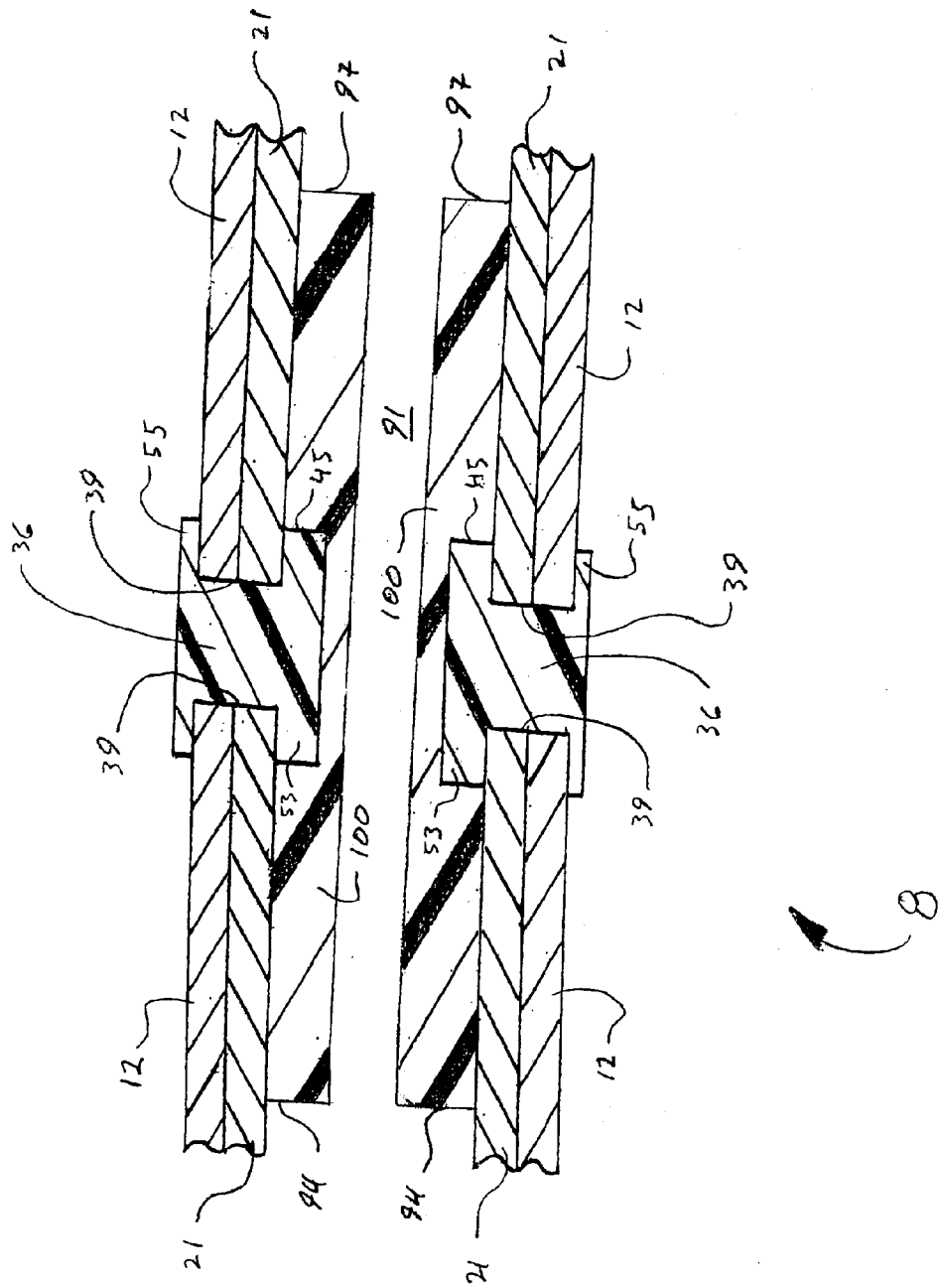
FIG. 7 is a representative sectional view of a tubular assembly according to the present invention in which the plug has a passage there through providing fluid communication between the two ends of the plug.

The plug of the tubular assembly may optionally include at least one passage that provides fluid communication between the two ends of the plug. Overlap region 8 of the tubular assembly depicted in FIG. 7 includes a passage 91 that provides fluid communication between ends 94 and 97 of plug 100. Passage 91 can allow the passage of fluids, such as gasses and/or liquids between the interiors of the connected tubes. Allowing the passage of fluids through and between the interiors of the connected tubes is desirable if the tubular assembly is to be used, at least in part, as a conduit for such fluids. In addition, passage 91 can serve to reduce the buildup of pressure in one tube relative to another tube, if the tubes are exposed to elevated temperatures.

Figure 5:
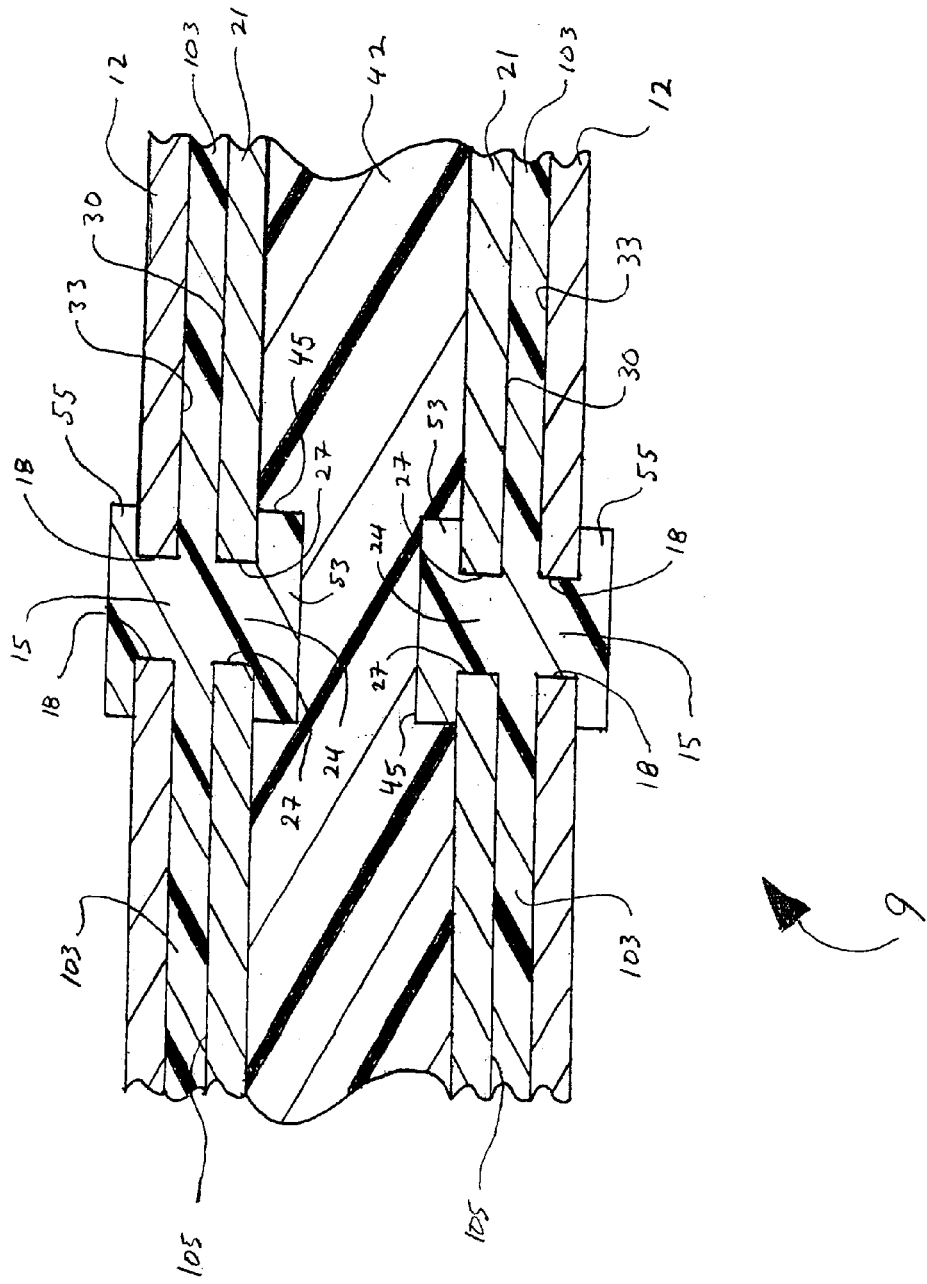
FIG. 5 is a representative sectional view of a tubular assembly according to the present invention having an annular space between the first and second tubes that is filled with injected plastic material that is continuous with the plastic material injected through the aligned perforations of the tubes and into the cavities of the plug.

In an embodiment of the present invention, the interior surfaces of the first tube and the exterior surfaces of the second tube define an annular space, and the plastic material, that is molded into the cavities of the plug, extends at least partially into the annular space. With reference to FIG. 5, overlap connection region 9 includes an annular space 105 that is defined by interior surface 33 of first tube 12 and exterior surface 30 of second tube 21. Plastic material 53 is molded through perforation 15 of first tube 12, perforation 24 of second tube 21 and into cavity 45 of plug 42. The molded on (or injected) plastic material 53 extends into annular space 105 as plastic material 103. Plastic material 53 extending through perforations 15 and 24 and into cavity 45 is continuous with attachment head 55 and the plastic material 103 extending into annular space 105. Edges 18 of perforation 15 and edges 27 of perforation 24 are embedded in the plastic material extending there through. Plastic material 103 may be selected from thermoset plastic materials and/or thermoplastic materials, including those examples as recited previously herein. Plastic materials 103 and 53 may be the same or different, but are typically the same.

During the molding of plastic material through perforations 15 and 24 and into the cavities 45 and annular space 105, annular space 105 may be maintained by art-recognized means. For example, each of first tube 12 and second tube 21 may be externally supported such that annular space 105 is formed and maintained prior to the injection of plastic material. Alternatively, spacers, such as plastic balls or rods (not shown), may be introduced between interior surface 33 of first tube 12 and exterior surface 30 of second tube 21 to form and maintain annular space 105 prior to the injection of plastic material.

At least some of the cavities in the exterior surface of the plug may be in the form of annular grooves that are aligned with at least some of the aligned perforations of the first and second tubes. Plastic material molded through the aligned perforations of the first and second tubes extends into and at least partially fills the annular grooves aligned therewith. Preferably, each of the first tube, second tube and the plug (having annular grooves therein) are substantially cylindrical. When each of the first tube, second tube and the plug are substantially cylindrical, the association between the aligned perforations, the annular grooves and the plastic material extending there through and filling thereof allows first and second tubes to be rotatable about the plug. Rotation of the first and second tubes about the plug may occur when rotation of the plug is inhibited, for example by externally fixing the plug in place. In addition, the plug may be rotatable within and relative to the first and second tubes, when rotation of the first and second tubes is inhibited relative to the plug.

Figure 6:
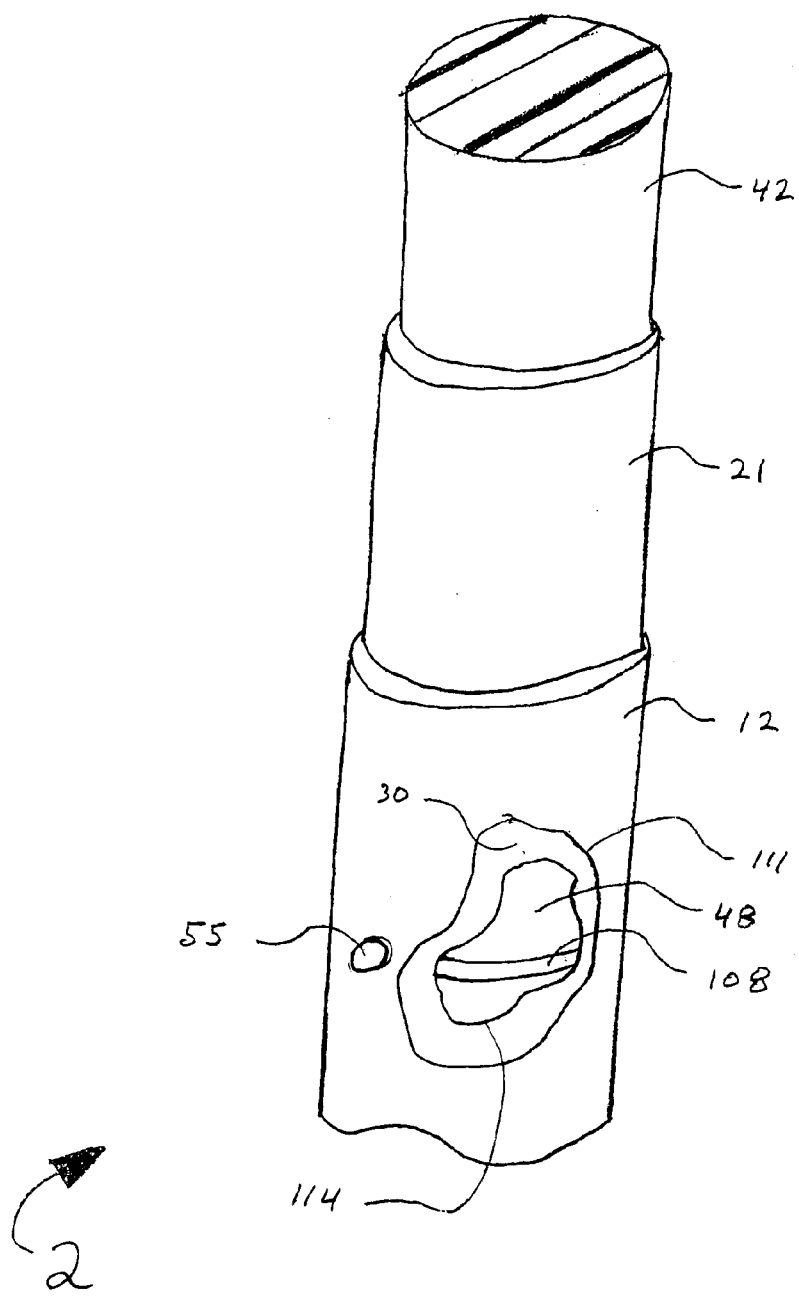
FIG. 6 is a representative perspective view of a tubular assembly according to the present invention in which a partial cut-away through the first and second tubes reveals an annular groove in the exterior surface of the plug.

With reference to FIG. 6 a perspective view of tubular assembly 2 is depicted, which includes partial cut-aways 111 and 114 through each of first tube 12 and second tube 21 reveals an annular groove 108 in exterior surface 48 of plug 42. Each of first tube 12, second tube 21 and plug 42 are substantially cylindrical. The plastic material of attachment head 55 is continuous with plastic material (not shown) filling annular groove 108. When rotation of plug 42 of FIG. 6 is prevented, tubes 12 and 21 may together be rotatable about plug 42. Alternatively, when rotation of tubes 12 and 21 is prevented, plug 42 may be rotatable within and relative to tubes 12 and 21. Rotation of tubes 12 and 21 around plug 42, or of plug 42 within tubes 12 and 21, can be enhanced by increasing the lubricity between the plastic material injected into annular groove 108 and the material of plug 42 which defines groove 108 (i.e., the walls of groove 108). Increased lubricity can be achieved by means of appropriate selection of injected plastic material and the material from which plug 42 is fabricated, or by means of introducing a lubricating agent into groove 108 prior to injection of plastic material, as is known to the skilled artisan.

Tubular assemblies according to the present invention may form at least part of tubular frames that are used in a wide variety of applications and markets. For example, the tubular assemblies of the present invention may be used in applications including, but not limited to: chairs, such as aircraft and automotive seats; wheel chairs; walkers (to assist in ambulating); canes; aircraft and automotive space frames; and motorcycle and bicycle frames.

The present invention has been described with reference to specific details of particular embodiments thereof. It is not intended that such details be regarded as limitations upon the scope of the invention except insofar as and to the extent that they are include in the accompanying claims.

What is claimed is:

1. A tubular assembly comprising:
    (a) a first tube having a plurality of perforations having edges;
    (b) a second tube having a plurality of perforations having edges, a portion of said second tube residing within a portion of said first tube, and at least some of said perforations of said first and second tubes being aligned and together defining aligned perforations having edges; and
    (c) a plug residing within at least a portion of said second tube, said plug having an exterior surface, said exterior surface having cavities therein, at least some of said cavities being aligned with said aligned perforations of said first and second tubes, wherein said tubular assembly is prepared by a process comprising molding plastic material through at least some of said aligned perforations of said first and second tubes and into said aligned cavities within said plug, the edges of said aligned perforations being embedded in the plastic material extending therethrough, thereby fixedly attaching said first tube, said second tube and said plug together.

2. The tubular assembly of claim 1 wherein each of said first and second tubes have interior and exterior surfaces, a portion of the exterior surfaces of said second tube abut a portion of the interior surfaces of said first tube, and at least a portion of the exterior surfaces of said plug abut at least a portion of the interior surfaces of said second tube.

3. The tubular assembly of claim 1 wherein the aligned cavities of said plug are of greater dimension than the aligned perforations of said first and second tubes.

4. The tubular assembly of claim 1 wherein the plastic material extending through said aligned perforations and into said aligned cavities is continuous with a molded on attachment head of plastic material on the exterior surface of said first tube.

5. The tubular assembly of claim 1 wherein the plastic material extending through said aligned perforations and into said aligned cavities is continuous with molded on plastic material encasing at least a portion of the exterior surface of said first tube.

6. The tubular assembly of claim 1 wherein each of said first tube, second tube and said plug are fabricated from a material independently selected from metal, thermoplastic material, thermoset plastic material and combinations thereof.

7. The tubular assembly of claim 6 wherein said first and second tubes are each independently fabricated from metal, and said plug is fabricated from a material selected from thermoplastic materials and thermoset plastic materials.

8. The tubular assembly of claim 1 wherein each of said first tube and second tube are independently selected from substantially cylindrical tubes, substantially elliptical tubes, polygonal tubes and combinations thereof; and said plug is selected from substantially cylindrical plugs, substantially elliptical plugs, polygonal plugs and combinations thereof.

9. The tubular assembly of claim 8 wherein each of said first and second tubes are substantially cylindrical tubes, and said plug is a substantially cylindrical plug.

10. The tubular assembly of claim 1 wherein said plug is a substantially solid plug.

11. The tubular assembly of claim 1 wherein said plug has two ends, and at least one passage providing fluid communication between the two ends of said plug.

12. The tubular assembly of claim 1 wherein the plastic material molded through said aligned perforations and into said aligned cavities is selected from thermoset plastic materials, thermoplastic materials and combinations thereof.

13. The tubular assembly of claim 12 wherein the plastic material molded through said aligned perforations and into said aligned cavities is a thermoplastic material selected from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

14. The tubular assembly of claim 12 wherein the plastic material molded through said aligned perforations and into said aligned cavities is reinforced with a material selected from glass fibers, carbon fibers, metal fibers, polyamide fibers and mixtures thereof.

15. The tubular assembly of claim 1 wherein each of said first and second tubes have interior and exterior surfaces, a portion of the exterior surfaces of said second tube and a portion of the interior surfaces of said first tube together defining an annular space, the plastic material molded through said aligned perforations and into said aligned cavities also extends continuously and at least partially into said annular space.

16. The tubular assembly of claim 1 wherein at least some of said aligned perforations have deformed edge portions, the deformed edge portions being embedded in the plastic material extending therethrough.

17. The tubular assembly of claim 1 wherein said cavities are in the form of annular grooves in the exterior surface of said plug (c), plastic material being molded through said aligned perforations and into said annular grooves, and said annular grooves being at least partially filled with plastic material.

18. The tubular assembly of claim 17 wherein each of said first tube, second tube and said plug are substantially cylindrical.

19. The tubular assembly of claim 18 wherein said first and second tubes are together rotatable around said plug.

20. The tubular assembly of claim 18 wherein said plug is rotatable within said first and second tubes.

* * * * *